US007104515B2

(12) United States Patent
Harless et al.

(10) Patent No.: US 7,104,515 B2
(45) Date of Patent: Sep. 12, 2006

(54) FLEXURE ELASTOMER ANTENNA ISOLATION SYSTEM

(75) Inventors: Richard I. Harless, Palm Bay, FL (US); Michael Hoffman, Palm Bay, FL (US); Dennis Calhoun, Palm Bay, FL (US); Robert T. Fandrich, Jr., Palm Bay, FL (US); Andrew J. Vajanyi, Palm Bay, FL (US); Therese Boyle, Palm Bay, FL (US); David S. Albert, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 119 days.

(21) Appl. No.: 10/987,061

(22) Filed: Nov. 12, 2004

(65) Prior Publication Data

US 2006/0102825 A1 May 18, 2006

(51) Int. Cl.
*F16M 13/00* (2006.01)

(52) U.S. Cl. ........................ 248/562; 248/638; 343/878

(58) Field of Classification Search ................ 248/562, 248/580, 581, 583, 589, 638, 678; 343/878
See application file for complete search history.

(56) References Cited

U.S. PATENT DOCUMENTS 5,014,564 A * 5/1991 Culkin .......................... 74/61
5,285,995 A * 2/1994 Gonzalez et al. ........... 248/550
6,290,183 B1 9/2001 Johnson et al.
6,471,435 B1 10/2002 Lee
6,648,295 B1 * 11/2003 Herren et al. ............... 248/636
6,695,106 B1 2/2004 Smith et al.

* cited by examiner

*Primary Examiner*—Ramon O Ramirez
(74) *Attorney, Agent, or Firm*—Sacco & Associates, PA; Robert J. Sacco

(57) ABSTRACT

A vibration isolation system (100) for a payload (102). The vibration isolation system provides a level of vibration isolation for all vibration translational and rotational components, while minimizing the moment of the payload mass relative to the isolation system. The system includes a base (104) and a plurality of vibration isolators (114). Each vibration isolator includes a semi-rigid first support member (202) having first portion (204) positioned below the base and an opposing second portion (206) positioned above the base, and a second support member (208) having a first portion (210) fixed to the base and an opposing second portion (212) extending above the base. An elastomeric coupling (228) couples the first support member to the second support member at a height that is approximately equal to a height of a center of gravity (302) of a combined mass of the base and the payload above the base.

11 Claims, 3 Drawing Sheets

FLEXURE ELASTOMER ANTENNA ISOLATION SYSTEM

GOVERNMENT RIGHTS IN THIS INVENTION

This invention was made with U.S. government support under Prime Contract Number HQ0006-01-C-0001 awarded by the Department of Defense. The U.S. government has certain rights in this invention.

BACKGROUND OF THE INVENTION

1. Statement of the Technical Field

The inventive arrangements relate to the field of RF antennas, and more particularly, to antenna pedestals.

2. Description of the Related Art

Oftentimes RF communication antennas are operated in environments which are not ideal. For example, it is common to find communication antennas mounted to mobile craft, such as aircraft, watercraft, automobiles and military vehicles, all of which experience some levels of vibration. Such vibration can induce beam radial errors in communication antenna reflectors, especially antennas which communicate via microwave signals having beam radiation patterns.

Vibration can include up to six acceleration components which interfere with antenna tracking. Specifically, the acceleration components include translational components along the x, y and z axes and rotational components about each of the three axes. Random vibrations typically are a composite of all six vibration components.

Vibration dampeners for absorbing vibration energy are known. However, simultaneously dampening of all six acceleration components has proven to be particularly difficult. For example, U.S. Pat. No. 6,695,106 to Smith et al. discloses a tunable vibration isolator for isolating a fuselage of a helicopter or rotary wing aircraft from other aircraft components, such as the engine or transmission. Smith's vibration isolator is of limited value, however, because it primarily dampens only a single translational component of vibration.

U.S. Pat. No. 6,471,435 to Lee discloses a flexural joint with two degrees of freedom. However, as noted, vibration can include up to six acceleration components. Thus, the flexural joint disclosed by Lee would not provide optimum vibration dampening for a communication antenna which is mounted onto a mobile craft.

U.S. Pat. No. 6,290,183 to Johnson et al. discloses a three-axis vibration device for use in a spacecraft vibration isolation system. The vibration device utilizes a plurality of dual-beam flexure isolation devices disposed between a payload and the spacecraft. Notably, the center of gravity of the payload is significantly offset from the flexure isolation devices. This arrangement results in a large moment of the payload mass relative to the vibration device. In consequence, the excitation response of the payload mass at the system resonant frequency will be high.

SUMMARY OF THE INVENTION

The present invention relates to a vibration isolation system for a payload mass, such as an RF communications antenna. The vibration isolation system provides a level of vibration isolation for all vibration in the three translational and three rotational components, while minimizing the moment of the payload mass relative to the isolation system. The vibration isolation system can include a base to which a payload having mass, for example a communications antenna and antenna pedestal, is coupled and a plurality of vibration isolators.

Each of the vibration isolators can include a semi-rigid first support member having a first portion positioned below the base and an opposing second portion positioned above the base. For example, the first support member can be a vertical support member. Each of the vibration isolators also can include a second support member having a first portion fixed to the base and an opposing second portion extending above the base. The second support member can be, for example, a support tube. In this arrangement the first support member can be positioned coaxially within the support tube and extend through a respective aperture defined in the base.

An elastomeric coupling can be provided to couple the second portion of the first support member to the second portion of the second support member. A height of the elastomeric coupling with respect to the base can be approximately equal to a height above the base of a center of gravity of a combined mass of the base and the payload.

Each of the second support members can include a cap member. The cap member can be fixed the second portion of a respective support tube. The elastomeric coupling can be positioned between the cap members and the second portion of the first support member.

DETAILED DESCRIPTION OF THE PREFERRED EMBODIMENTS

The present invention relates to a vibration isolation system (hereinafter "isolation system") for a payload mass, such as an RF communications antenna. The isolation system provides a level of vibration isolation for all vibration in the three translational and three rotational components, while minimizing the moment of the payload mass relative to the isolation system. Accordingly, the excitation response of the payload mass at the system resonant frequency is minimal relative to the level of vibration excitation. Additionally, the rotational and translational modes of the system can be independently tuned to achieve desired natural frequencies. Advantageously, the modes can be selected to be at frequencies which are significantly lower or higher than the fundamental frequencies of respective vibration components. In consequence, vibration attenuation is much improved relative to vibration isolation systems of the prior art.

Figure 1:
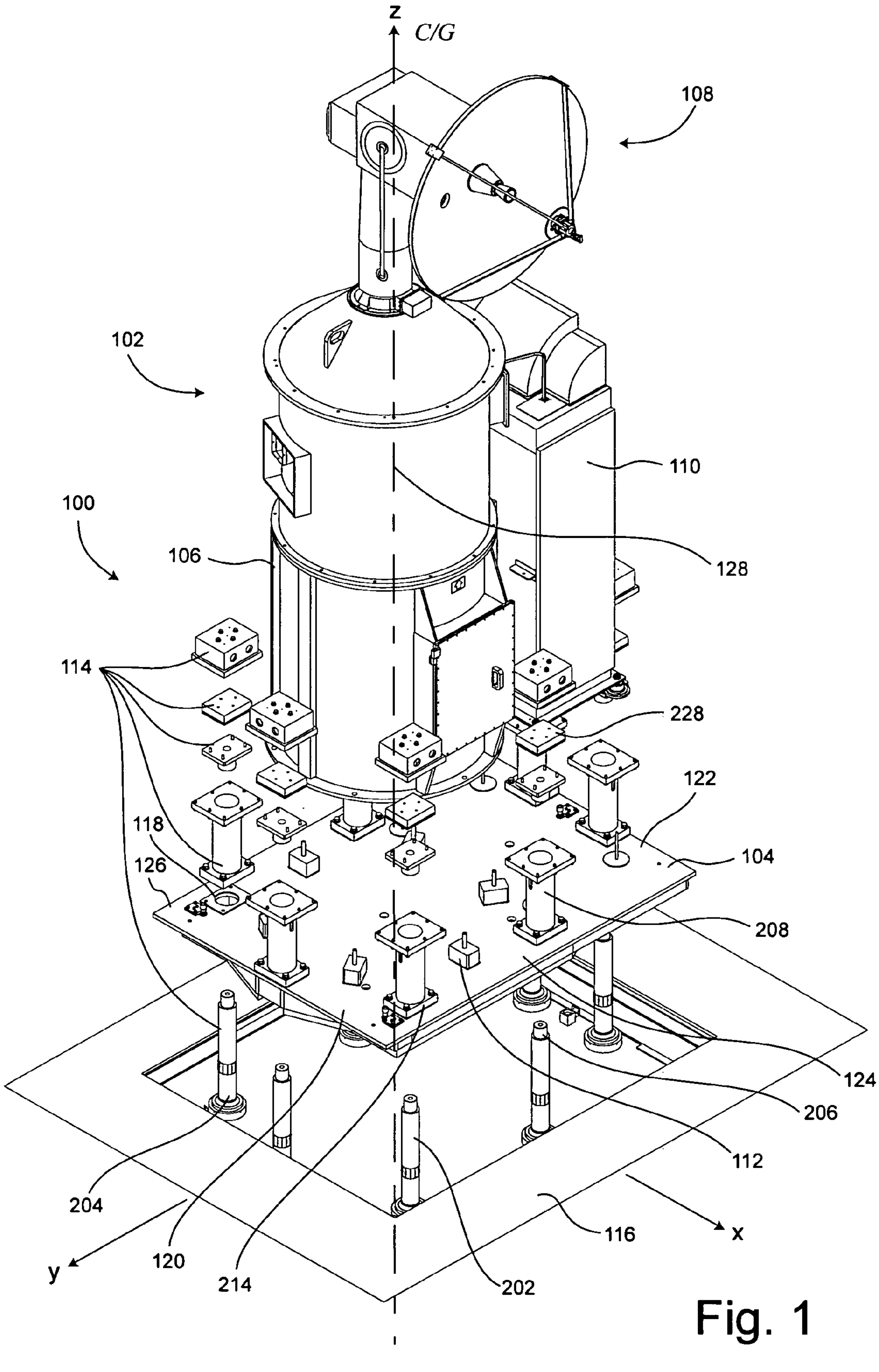
FIG. 1 is an exploded perspective view of a vibration isolation system and payload which is useful for understanding the present invention.

FIG. 1 is a perspective view depicting an exploded view of a vibration isolation system 100 and payload 102 which is useful for understanding the present invention. The vibration isolation system 100 can include a base 104 to which the payload 102 is coupled. As shown, the payload 102 comprises an antenna pedestal 106, a communications antenna 108, and an antenna control module 110. It should be noted, however, that the invention is not limited in this regard. Specifically, the payload 102 can be any object having a mass which can be coupled to the base 104. The payload 102 can be coupled to the base 104 using any suitable means. For example, standoffs 112 can be provided for coupling the load 102 to the base 104. In one arrangement the standoffs can comprise a substantially metallic structure. Alternatively, the standoffs can comprise an elastomer positioned between the payload 102 and the base 104 to provide a degree of vibration isolation between the respective structures.

A plurality of vibration isolators 114 can be provided to couple the base 104 to a platform 116. The vibration isolators 114 can be distributed around the base 104 at selected locations. The arrangement of the vibration isolators 114 can be selected to adjust a rotational natural frequency of the base 104 and payload 102 about the three axes without impacting translational mode dampening of the system. More particularly, dampening of the rotational vibration components can be increased by increasing a distance of each of the vibration isolators 114 from a vertical center of gravity 128 of the combined mass of the payload 102 and base 104, while locating the vibration isolators closer to the center of gravity 128 can decrease the rotational dampening of the system 100. The ability to selectively tune rotation vibration dampening independently of translational vibration dampening is an important advantage of the present system 100 because rotational vibration components are largely responsible for high beam radial errors in communication antennas.

Figure 2:
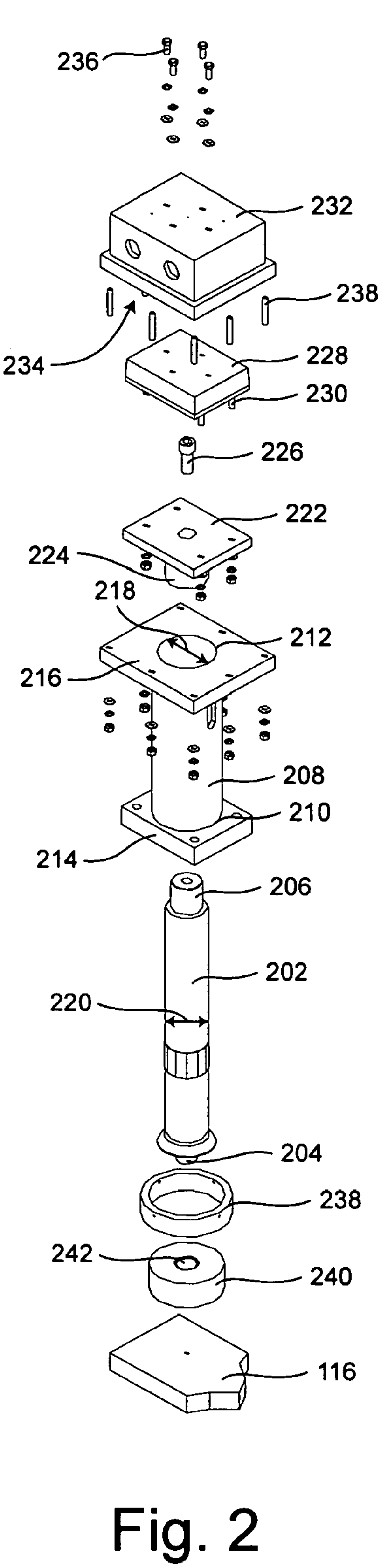
FIG. 2 is an exploded perspective view of a vibration isolator which is useful for understanding the present invention.

An exploded view of a vibration isolator 114 is shown in FIG. 2. The vibration isolator 114 can include a semi-rigid first support member 202 and a second support member 208. The first support member 202 can have a first end 204 and an opposing second end 206. Similarly, the second support member 208 can have a first end 210 and an opposing second end 212.

The first support member 202 can comprise metal, fiberglass, composite material, plastic, or any other semi-rigid material suitable for supporting the mass of the payload while providing a degree of structural compliance and vibration energy absorption. As defined herein, the term "semi-rigid" as applied to the first support member 202 means that the first support member 202 can flex in a radial direction to absorb vibration energy, while simultaneously supporting at least a portion of the mass of the payload. Notably, the present invention does not require that the first support member 202 have a specific spring constant, stiffness or strength. Rather, the vertical support member 202 can be selected to provide a desired amount of vibration absorption and/or support stiffness which is optimized for the particular payload. For example, a structural compliance of the support member 202 can be selected to tune the fundamental modes of the system 100 to a desired natural frequency which maximizes the effectiveness of the vibration isolator 114. More particularly, the natural frequency can be selected to be significantly lower or higher than the fundamental frequency of the primary vibrational input.

In the arrangement shown, the second support member 208 is embodied as a rigid support tube having mounting plates 214 and 216 attached to respective ends 210 and 212 of the second support member 208. An inner diameter 218 of the second support member 208 can be greater than an outer diameter 220 of the first support member 202 so that the first support member 202 can be coaxially positioned within the second support member 208. It is preferred that the diameter 218 of the second support member 208 is sufficient to allow a degree of movement and/or flexure of the first support member 202 within the second support member 208. In an alternate arrangement (not shown) the first support member 202 and the second support member 208 can be disposed in a non-coaxial manner. Moreover, the second support member 208 can be flexible or semi-rigid.

The first support member 202 can extend through the second support member 208 so that the second end 206 of the first support member 202 is disposed above the mounting plate 216. Further, the second end 206 of the first support member 202 can engage an elastomer support 222. The elastomer support 222 can be rigid or semi-rigid. Further, the elastomer support 222 can comprise a socket 224 for receiving the second end 206 of the first support member 202. One or more fasteners 226 can fix the elastomer support 222 to the first support member 202.

An elastomeric coupling 228 can be fixed to the elastomer support 222 in any suitable manner, for example with fasteners 230, so that the elastomer is coupled to the first support member 202. The elastomeric coupling 228 can comprise an elastomer, which can be any suitable polymer having elastic properties. For example, a suitable elastomer can be rubber or neoprene, although the invention is not limited in this regard. One example of an elastomeric coupling 228 that can be used is a J-6332-183 Flex-Bolt® Sandwich Mount available from Western Rubber & Supply, Inc. of Livermore, Calif. The J-6332-183 Flex-Bolt® Sandwich Mount can receive a maximum compression load of 13,440 lb and a maximum shear load of 1,680 lb. Further, the J-6332-183 Flex-Bolt® Sandwich Mount has a compression stiffness of 42,100 lb/in. and a shear stiffness of 4,200 lb/in. Still, other elastomeric couplings can be used and the invention is not limited in this regard. For example, if the payload has relatively little mass, an elastomeric coupling having less load capability and stiffness can be used. Similarly, if the payload has a relatively large mass, an elastomeric coupling having greater load capability and stiffness can be used. A wide range of such elastomeric couplings are available from Western Rubber & Supply, Inc., as well as other vendors.

A cap member 232 can be provided to couple the elastomeric coupling 228 to the second support member 208. In particular, the cap member 232 can be configured to position the elastomeric coupling 228 between the cap member 232 and the elastomer support 222. For example, the cap member can define a cavity 234 in which the elastomeric coupling 228 is disposed. One or more fasteners 236 can fix the elastomeric coupling 228 to the cap member 232. Further, one or more fasteners 238 can fix the cap member 232 to the mounting plate 216. As shown, the elastomer support 222 is not coupled directly to the second support member 208, but instead is coupled to the second support member 208 via the elastomeric coupling 228 and the cap member 232. This configuration enables the elastomeric coupling 228 to provide vibration isolation between the first support member 202 and the second support member 208.

In an embodiment in which the support member must be welded to the platform 116, a base ring 238 and a base disk 240 can be provided to minimize weld distortions, which can cause misalignment of the first support member 202 relative to the base. In particular, the base ring 238 can be welded to the platform 116. The base disk 240 can be disposed within the base ring 238 and welded to the base ring 238. The first end 204 of the first support member 202 can be fixed to the base disk 240. For example, the first end 204 can be provided with threads and screwed into a threaded receiving aperture 242 in the base disk 240. Alternatively, the first end 204 of the first support member 202 can be welded to the base disk 240.

Again turning attention to FIG. 1, one or more apertures 118 can be defined in the base 104 through which respective first support members 202 can extend. The inner diameter of each second support member 208 can be aligned with a respective aperture 118, and the mounting plate 214 of each second support member 208 can be fixed to the base 104. Accordingly, the first end 204 of each first support member 202 can be positioned below the base 104 while the second end 206 of each support member 202 can be positioned above the base 104.

As shown, the vibration isolators 114 can be distributed around the base 104. Positioning of the vibration isolators 114 in this fashion provides both translational and rotational vibration isolation. In particular, each of the first support members 202 can bend in a same x and/or y direction to isolate translational vibration components along the x and y axes. The elastomeric couplings 228 also can stretch and compress along the x and/or y axes to provide a degree of isolation for such translational vibration components. Further, each of the elastomeric couplings 228 can compress and stretch in unison along the z axis to isolate translational components along the z axes.

To isolate rotational vibration components about the z axis, each of the first support members 202 can deflect circumferentially about the z axis and the elastomeric couplings 228 can compress and stretch in unison about the same z axis. Finally, elastomeric couplings 228 coupled to a first side 120 of the base 104 can compress while elastomeric couplings 228 coupled to an opposing second side 122 of the base 104 can stretch, and vice versa. Similarly, elastomeric couplings 228 coupled to a third side 124 of the base 104 can compress while elastomeric couplings 228 coupled to a fourth opposing side 126 of the base 104 can stretch, and vice versa. Such compression and stretching of the elastomeric couplings can isolate rotational vibration components about the x and y axes.

Figure 3:
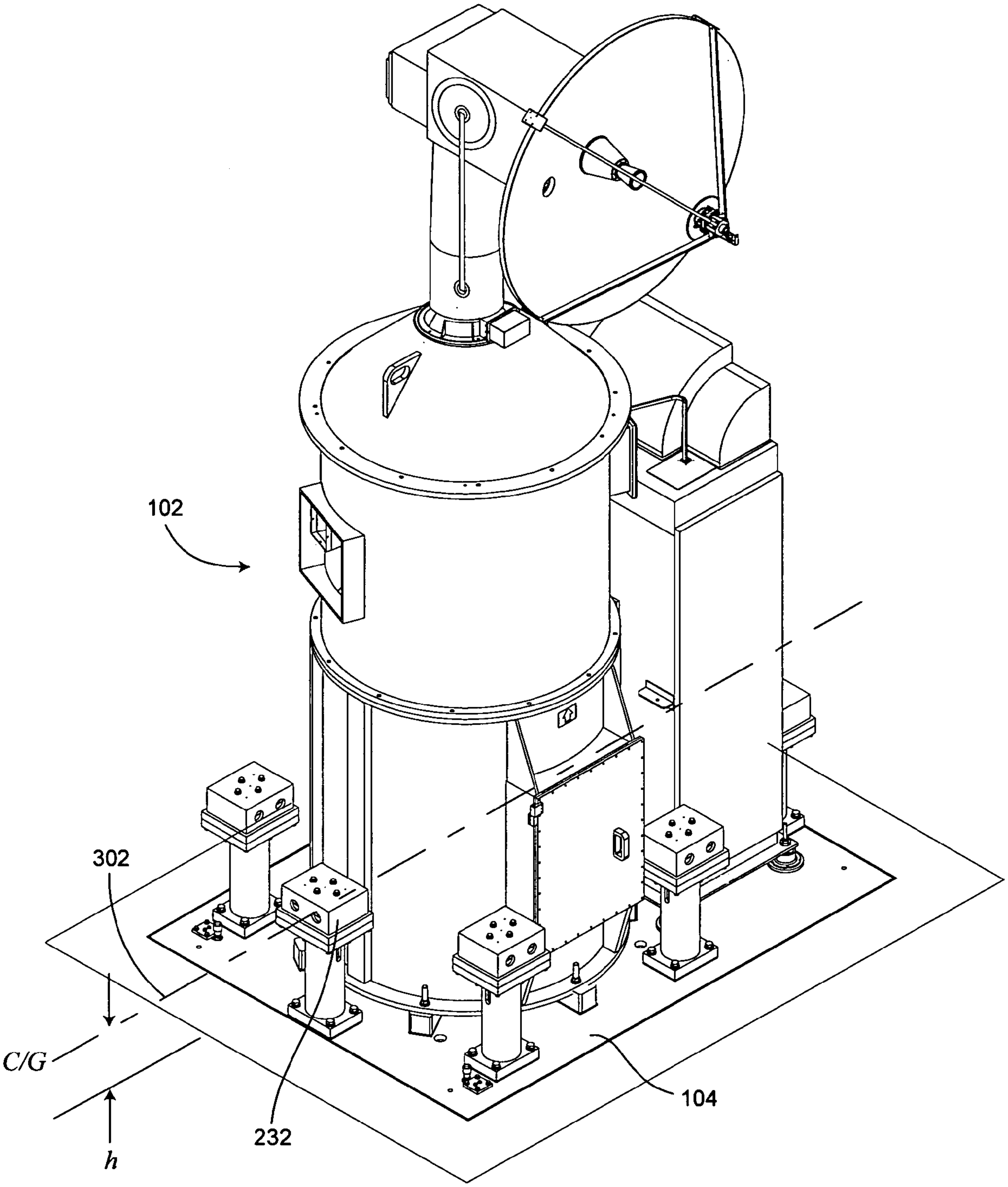
FIG. 3 is a perspective view of the vibration isolation system of FIG. 1.

A perspective view of the antenna isolation system of FIG. 1 is shown in FIG. 3. Notably, the cap members 232 and elastomeric couplings are positioned above the base 104. For example, the height h of the elasomeric couplings (disposed within the cavities of the cap members 232) can be approximately equal to a height of a horizontal center of gravity 302 of the combined mass of the payload 102 and base 104. Such a configuration can minimize the excitation response of the payload mass and maximize vibration attenuation above the system resonant frequency.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

We claim:

1. A vibration isolation system, comprising:

a base to which a payload having mass is coupled;

a plurality of semi-rigid first support members each having a first end positioned below said base and a second end positioned above said base;

a plurality of second support members each having a first end fixed to said base and an opposing second end extending above said base;

a plurality of elastomeric couplings which couple said second end of each of said first support members to said second end of at least one of said second support members;

wherein a height of said elastomeric coupling with respect to said base is approximately equal to a height above said base of a center of gravity of a combined mass of said base and said payload.

2. The vibration isolation system according to claim 1, wherein said mass comprises a communications antenna.

3. The vibration isolation system according to claim 1, wherein each of said second support members comprise a support tube.

4. The vibration isolation system according to claim 3, wherein each of said first support members is coaxially positioned within a respective support tube.

5. The vibration isolation system according to claim 4, wherein each of said first support members extends through a respective aperture defined in said base.

6. The vibration isolation system according to claim 5, further comprising a plurality of cap members, at least one of said cap members fixed to said second end said second support member, wherein a respective one of said elastomeric couplings is positioned between said cap member and said second end of said first support member.

7. A vibration isolation system, comprising:

a base to which a payload having mass is coupled;

a plurality of vibration isolators, each of said vibration isolators comprising:

a support tube having a first end fixed to said base and an opposing second second end extending above said base;

a semi-rigid vertical support member coaxially positioned within said support tube and extending through a respective aperture defined in said base, said vertical support member having a first end positioned below said base and an opposing second second end positioned above said base;

an elastomeric coupling which couples said second end of said vertical support member to said second end of said support tube.

8. The vibration isolation system according to claim 7, wherein a height of said elastomeric coupling with respect to said base is approximately equal to a height above said base of a center of gravity of a combined mass of said base and said payload.

9. The vibration isolation system according to claim 7, wherein each of said vibration isolators further comprises a cap member fixed to said second end of said support tube, and said elastomeric coupling is positioned between said cap member and said second end of said vertical support member.

10. The vibration isolation system according to claim 7, wherein said mass comprises a communications antenna.

11. A vibration isolation system, comprising:

a base to which a payload having mass is coupled;

a plurality of first support members each having a first portion positioned below said base and a second portion positioned above said base;

a plurality of second support members each having a first portion fixed to said base and an opposing second portion extending above said base;

a plurality of elastomeric couplings which couple said second portion of said first support members to said second portion of at least one of said second support members;

wherein said elastomeric coupling is positioned at a height which is higher than said base.

* * * * *